United States Patent
Rappenecker et al.

(10) Patent No.: US 10,107,371 B2
(45) Date of Patent: *Oct. 23, 2018

(54) MECHANISM AND SYSTEM FOR ROTATING AN ELONGATE MEMBER OF AN OIL PUMP

(71) Applicant: National Oilwell Varco, L.P., Houston, TX (US)

(72) Inventors: Jeremy Michael Rappenecker, Borger, TX (US); Matthew S. Davison, Choctaw, OK (US)

(73) Assignee: NATIONAL OILWELL VARCO, L.P., Houston, TX (US)

( * ) Notice: Subject to any disclaimer, the term of this patent is extended or adjusted under 35 U.S.C. 154(b) by 6 days.

This patent is subject to a terminal disclaimer.

(21) Appl. No.: 15/367,150

(22) Filed: Dec. 1, 2016

(65) Prior Publication Data

US 2017/0082183 A1    Mar. 23, 2017

Related U.S. Application Data

(63) Continuation of application No. 14/941,339, filed on Nov. 13, 2015, now Pat. No. 9,541,073.

(Continued)

(51) Int. Cl.
*E21B 43/12* (2006.01)
*F04B 47/02* (2006.01)
(Continued)

(52) U.S. Cl.
CPC ......... *F16H 37/122* (2013.01); *E21B 43/127* (2013.01); *F04B 9/045* (2013.01);
(Continued)

(58) Field of Classification Search
CPC ............... E21B 43/127; E21B 33/0415; E21B 17/1071; E21B 43/121; F04B 47/02;
(Continued)

(56) References Cited

U.S. PATENT DOCUMENTS 5,160,005 A * 11/1992 Burch ................... F02C 7/277
192/104 C
5,427,178 A    6/1995 Bland
(Continued)

OTHER PUBLICATIONS

PCT/US2015/060707 International Search Report and Written Opinion dated Feb. 10, 2016 (16 p.)
(Continued)

*Primary Examiner* — Daniel P Stephenson
(74) *Attorney, Agent, or Firm* — Conley Rose, P.C.

(57) ABSTRACT

A rotator mechanism for rotating an elongate member that is coupled to a reciprocating member of a pumping system includes: a body having a through-hole for receiving a portion of the elongate member; a first freewheel clutch configured to cause the elongate member to rotate incrementally about the body axis in a predetermined direction when the reciprocating member reciprocates; and a second freewheel clutch spaced from the first clutch and configured to prevent the elongate member from rotating opposite the predetermined direction when the reciprocating member reciprocates. One or both of the clutches includes circumferentially-spaced clutch elements, that may include rollers or sprags or both.

21 Claims, 6 Drawing Sheets

Related U.S. Application Data (60) Provisional application No. 62/079,579, filed on Nov. 14, 2014.

(51) Int. Cl.
  *F16D 41/07* (2006.01)
  *F16H 19/08* (2006.01)
  *F16H 31/00* (2006.01)
  *F16H 37/12* (2006.01)
  *F04B 9/04* (2006.01)
  *F04B 19/22* (2006.01)
  *F04B 53/14* (2006.01)

(52) U.S. Cl.
  CPC .............. *F04B 19/22* (2013.01); *F04B 47/02* (2013.01); *F04B 47/022* (2013.01); *F04B 47/026* (2013.01); *F04B 53/14* (2013.01); *F16D 41/07* (2013.01); *F16H 19/08* (2013.01); *F16H 31/001* (2013.01)

(58) Field of Classification Search
  CPC ...... F04B 19/22; F04B 47/022; F04B 47/026; F04B 53/14; F04B 9/045; F16D 41/07; F16H 19/08; F16H 31/001; F16H 37/122
  See application file for complete search history.

(56) References Cited

U.S. PATENT DOCUMENTS

| | | | |
|---|---|---|---|
| 6,026,898 | A | 2/2000 | Bland et al. |
| 9,541,073 | B2* | 1/2017 | Rappenecker .......... F04B 9/045 |
| 2002/0121367 | A1 | 9/2002 | Meek et al. |
| 2008/0035325 | A1 | 2/2008 | Ali-Zada et al. |
| 2008/0179156 | A1* | 7/2008 | Byun ................... F16D 41/066 |
| | | | 192/45.1 |

OTHER PUBLICATIONS

R&M Energy Systems, Inc., "New Era Rod Guides," 2010 (20 p.).
R&M Energy Systems, Inc., "Suggested Installation Procedures for Hercules Rod Rotators," Nov. 12, 2008 (2 p.).
Office Action dated Mar. 2, 2016, for U.S. Appl. No. 14/941,339 (16 p.).
Response to Office Action Dated Mar. 2, 2016, for U.S. Appl. No. 14/941,339; Response filed Jun. 1, 2016 (21 p.).
Notice of Allowance dated Sep. 1, 2016, for U.S. Appl. No. 14/941,339 (14 p.).
Amendment After Allowance dated Sep. 28, 2016, for U.S. Appl. No. 14/941,339 (10 p.).

\* cited by examiner

MECHANISM AND SYSTEM FOR ROTATING AN ELONGATE MEMBER OF AN OIL PUMP

CROSS-REFERENCE TO RELATED APPLICATIONS

This application is a continuation of U.S. application Ser. No. 14/941,339 filed Nov. 13, 2015, and entitled "A Mechanism and System for Rotating an Elongate Member of an Oil Pump," which claims the benefit of U.S. provisional patent application Ser. No. 62/079,579 filed Nov. 14, 2014, and entitled "A Mechanism and System for Rotating an Elongate Member of an Oil Pump," both of which are hereby incorporated herein by reference in their entirety for all purposes.

STATEMENT REGARDING FEDERALLY SPONSORED RESEARCH OR DEVELOPMENT

Not applicable.

BACKGROUND

Field of the Disclosure

This disclosure relates generally to equipment for recovering fluid, which may be a liquid and/or a gas, from within the earth. More particularly, it relates to an oil and gas production pump. Still more particularly, this disclosure relates to an apparatus and system for rotating a polish rod/sucker rod that is reciprocated by an arm on an oil and gas production surface pump.

Background to the Disclosure

At various production wells, oil and gas is extracted using one of several types of reciprocating pumps. In a common application, the pump includes a series or "string" of sucker rods extending below the surface of the earth within a stationary series or string of production tubing. The production tubing is positioned within a wellbore casing. An "insert pump" or a "down-hole pump" (or "downhole pump") is coupled to the end of the sucker rod string and is positioned adjacent the end of the production tubing string pump. Reciprocation of the sucker rod string acting on the downhole pump draws fluid, e.g. oil or gas, into the production tubing and raises the fluid to the surface of the earth. The sucker rod is coupled to a means of reciprocation, such as a pivoting or "walking beam" on a pumping jack. A polished rod extends upward from the sucker rod string to a carrier bar coupled by cables to one end of the surface unit's walking beam.

For a longer service life, the sucker rod and polished rod are rotated relative to the stationary production tubing by the action of a rod rotator located near the intersection of the polished rod and the carrier bar. To insure the rods rotate in only one direction, conventional rod rotators include a ratchet mechanism. A conventional ratchet mechanism has a minimum angle through which it must be rotated so that the rod will progressively rotate in the appropriate direction rather than just oscillate back-and-forth. Some conventional ratchet mechanisms include an annular ring with internal teeth, circumferentially spaced at even intervals and one or more pawls that rotate within the annular ring, sequentially engaging the teeth. The pawl is coupled for rotation with an axial that drives the rotation of the polished rod. The angular spacing of the teeth on the ring determine the smallest angle of rotation that will allow the pawl to progress and hold a new position, allowing the polished rod to progress to a new position. Any smaller rotation of the axial and pawl allows the pawl to return to its former resting place. As an example, for an annular ring having 24 teeth, the pawl and axle must rotate through a minimum angle of 15° (i.e. 360°/24) in order to progress to the next tooth to hold the pawl and axle in a new angular position and ultimately to rotate and hold the polished rod in a new angular position. The apparatus and system disclosed below offer an improved rod rotator intended to overcome various deficiencies of the prior art.

BRIEF SUMMARY OF THE DISCLOSURE

These and other needs in the art are addressed in one embodiment by a rotator mechanism for rotating an elongate member in a pumping system. In one embodiment, a rotator mechanism for rotating an elongate member that extends into a well bore and that is coupled to a reciprocating member of a pumping system includes: a rotator body having a body axis and a through-hole for receiving a portion of the elongate member; a first freewheel clutch configured to cause the elongate member to rotate incrementally about the body axis in a predetermined direction when the reciprocating member reciprocates; and a second freewheel clutch spaced from the first freewheel clutch and configured to prevent the elongate member from rotating opposite the predetermined direction when the reciprocating member reciprocates.

The first freewheel clutch and/or the second freewheel clutch may comprise a plurality of circumferentially-spaced bearing members, such as roller bearings.

The mechanism may further include: a worm gear disposed about the body axis; a worm meshing with the worm gear and extending along a worm axis that extends perpendicularly to the body axis; and a lever coupled to the worm and configured to rotate the worm relative to the body; the first clutch being coupled between the lever and the worm and configured to cause the worm to rotate in a first direction about the worm axis when the lever rotates in the first direction, and configured to allow the lever to rotate freely relative to the worm when the lever rotates in a second direction, opposite the first direction.

In certain embodiments, the second freewheel clutch is coupled to the worm and configured to allow the worm to rotate in the first direction and to prevent the worm from rotating in the second direction; wherein the first and second freewheel clutches each include a first race and a second race disposed about the worm axis, and a plurality of circumferentially-spaced clutch elements disposed between the first and second races. The clutch elements may include roller bearings, sprags or both.

In another embodiment, a rotator mechanism comprises: a worm gear configured to rotate an elongate member in incremental steps; a worm meshing with the worm gear and disposed for rotation about a worm axis; and a first clutch comprising a first race and a second race, the second race coupled to the worm so as to rotate along with the worm. In such embodiment, the first clutch is configured such that a plurality of repeated cycles that include incremental rotation of the first race in a first direction about the worm axis followed by rotation of the first race in a second direction about the worm axis causes the second race and the worm to make a plurality of incremental rotational movements that progress in the first direction. Within each of the repeated cycles, the first race moves in the first direction by an angle that is greater than zero and less than 15 degrees, or in other instances less than 7.5 degrees. In some embodiments, the mechanism includes a body having a through-hole configured to receive a portion of the elongate member; and a lever coupled to the first race of the first clutch to rotate along with the first race; and wherein the worm gear includes a central hole concentrically aligned with the through-hole of the body and configured to receive a portion of the elongate member. A plurality of circumferentially-spaced clutch elements may be disposed between the first and second races.

In a further embodiment, a rotator mechanism includes: a body including a longitudinal body axis and a through-hole aligned with the body axis and configured to receive a portion of an elongate member; a worm gear set having a worm gear disposed for rotation about the body axis; and a worm meshing with the worm gear and disposed for rotation about a worm axis; a lever coupled to the worm and configured to rotate the worm relative to the body; and a first clutch. The first clutch includes a first race coupled to the lever in a manner the prevents rotation of the first race relative to the lever; and a second race coupled to the worm in a manner the prevents rotation of the second race relative to the worm. The first clutch is configured to cause the worm and the second race to rotate in a first direction about the worm axis when the lever and the first race move in the first direction, and configured to allow the lever and the first race to rotate relative to the worm when the lever moves in a second direction about the worm axis, opposite the first direction; wherein the worm gear is configured to rotate the elongate member about the body axis when the worm rotates in the first direction.

The first clutch comprises circumferentially-spaced clutch elements between the first and second races, and the elements may include roller elements, sprags or both. The rotator mechanism may further include a second clutch having a first race coupled to the body in a manner the prevents rotation of the first race relative to the body and a second race coupled to the worm; the second clutch being configured to allow the worm to rotate in the first direction about the worm axis and to prevent the worm from rotating in the second direction about the worm axis.

The worm gear may be configured such that repeated cycles that include rotation of the first race in the first direction by an angle delta followed by rotation of the first race in the second direction opposite the first direction causes the second race and the worm to rotate incrementally, progressing in the first direction; and wherein, within each of the repeated cycles, the angle delta is greater than zero and less than 15 degrees, or in other embodiments, less than 7.5 degrees.

BRIEF DESCRIPTION OF THE DRAWINGS

For a detailed description of the disclosed embodiments, reference will now be made to the accompanying drawings in which.

NOTATION AND NOMENCLATURE

The following description is exemplary of certain embodiments of the disclosure. One of ordinary skill in the art will understand that the following description has broad application, and the discussion of any embodiment is meant to be exemplary of that embodiment, and is not intended to suggest in any way that the scope of the disclosure, including the claims, is limited to that embodiment.

The drawing figures are not necessarily to scale. Certain features and components disclosed herein may be shown exaggerated in scale or in somewhat schematic form, and some details of conventional elements may not be shown in the interest of clarity and conciseness. In some of the figures, in order to improve clarity and conciseness, one or more components or aspects of a component may be omitted or may not have reference numerals identifying the features or components that are identified elsewhere. In addition, within the specification, including the drawings, like or identical reference numerals may be used to identify common or similar elements.

As used herein, including in the claims, the following definitions and ideas will apply:

The terms "including" and "comprising" are used in an open-ended fashion, and thus should be interpreted to mean "including, but not limited to . . . ." Also, the term "couple" or "couples" means either an indirect or direct connection. Thus, if a first component couples or is coupled to a second component, the connection between the components may be through a direct engagement of the two components, or through an indirect connection that is accomplished via other intermediate components, devices and/or connections. The recitation "based on" means "based at least in part on." Therefore, if X is based on Y, X may be based on Y and any number of other factors.

In addition, the terms "axial" and "axially" generally mean along or parallel to a given axis, while the terms "radial" and "radially" generally mean perpendicular to the axis. For instance, an axial distance refers to a distance measured along or parallel to a given axis, and a radial distance means a distance measured perpendicular to the axis.

Furthermore, any reference to a relative direction or relative position is made for purpose of clarity, with examples including "top," "bottom," "up," "upward," "left," "leftward," "down," "lower," "clockwise," and the like. For example, a relative direction or a relative position of an object or feature may pertain to the orientation as shown in a figure or as described. If the object or feature were viewed from another orientation or were positioned differently, it may be appropriate to describe the direction or position using an alternate term. In regard to a borehole, "up," "upper," "upwardly" or "upstream" means toward the surface of the borehole and "down," "lower," "downwardly," or "downstream" means toward the terminal end of the borehole, regardless of the borehole orientation.

The use of ordinal numbers (i.e. first, second, third, etc.) to identify one or more components within a possible group of multiple similar components is done for convenience and clarity. In the disclosure that follows, the ordinal numbers used to identify or describe members of a particular group of components may not necessarily correspond to the ordinal numbers used in the Claims when referring to various members of the same group or a similar group of components.

DETAILED DESCRIPTION OF THE DISCLOSED EXEMPLARY EMBODIMENTS

Figure 1:
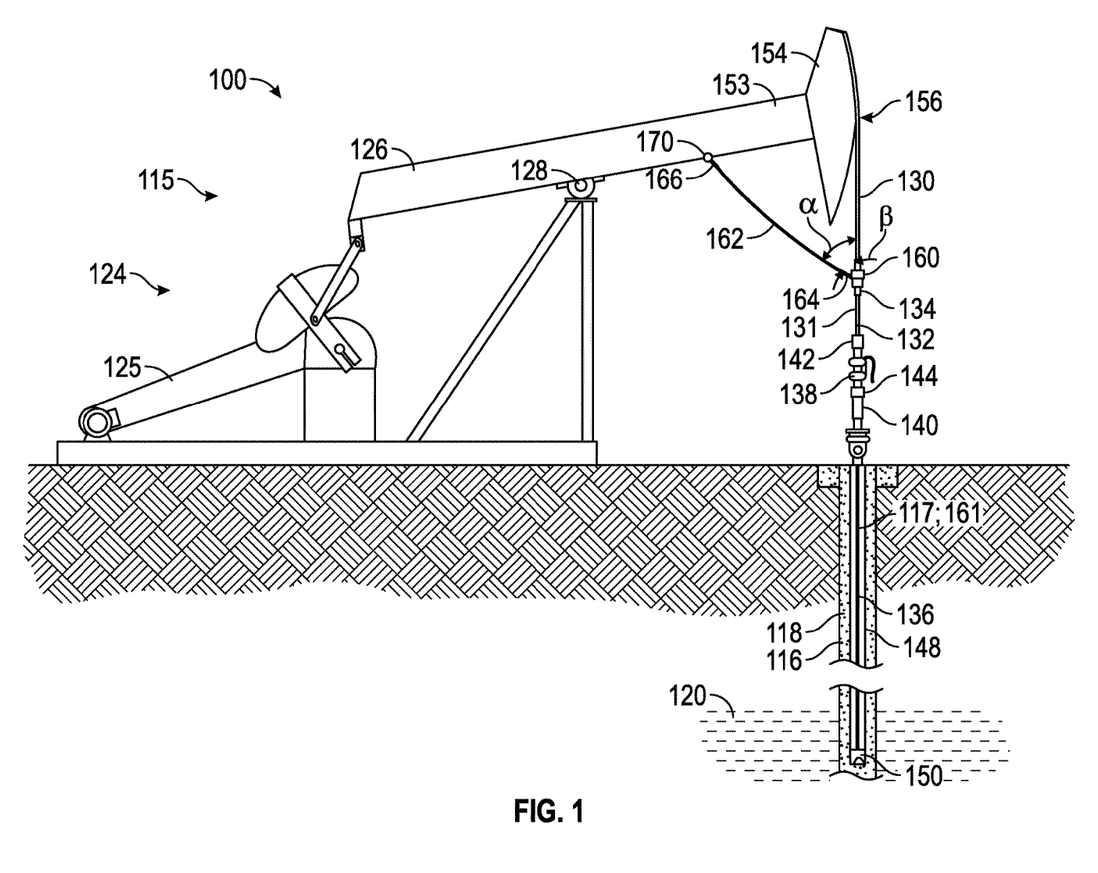
FIG. 1 shows a side view of an embodiment of a pumping system with a rotator mechanism installed at a production well in accordance with principles described herein.

Referring to FIG. 1, in an exemplary embodiment, a reciprocating pumping system 100 is installed at a production well 115 for hydrocarbons, including oil. Oil well 115 includes a wellbore 116, a longitudinal wellbore axis 117, and a casing 118 within the wellbore 116. The wellbore 116 extends down to a production zone 120 below the surface of the earth where hydrocarbons may be available for extraction. From the top of the wellbore 116, the axis 117 can be thought to extend vertically upward, for convenience of discussion. Pumping system 100, or simply, pump 100, includes a surface unit 124 having a drive unit 125, a "walking" or pivoting beam 126 elevated above the ground, a pivot axis 128 for the walking beam, and a cable assembly or "bridle" 130 extending generally vertically downward from the walking beam. During operation, the pivoting beam 126 reciprocates about pivot axis 128 through a prescribed angle and is an example of a reciprocating member in the surface unit. The pumping system 100 further includes an elongate pumping member or pumping string 131 coupled to the bridle 130, a "stuffing box" 138 at the wellhead, a string of production tubing 148 extending generally from the wellhead to the production zone 120, and a down-hole pump 150 fixedly coupled to the end of production tubing 148 and pumping string 131. The periodic movement of pivoting beam 126 causes pumping string 131 to reciprocate vertically. Pumping system 100 may also be called a pumping unit or, simply, a pump.

In FIG. 1, the pumping string 131 is generally aligned with axis 117 and includes a polished rod 132 extending generally from the bridle 130 into the well bore through the stuffing box 138 and includes a sucker rod string 136 coupled to the polished rod 132 extending further into the wellbore 116. The lower end of sucker rod 136 attaches or couples to the down-hole pump 150. The pumping string 131 may also be called a production string. In general, the term "pumping member configured to reciprocate" may broadly refer to such components as the polished rod 132, to the sucker rod 136, to pumping string 131, which includes rods 132, 136, or to down-hole pump 150, which includes a reciprocating member. In most or all of these examples, the pumping member configured to reciprocate and to rotate is elongate.

The stuffing box 138 is statically positioned at the wellhead, above the wellbore along with other equipment disposed around the polished rod 132, equipment such as, for example, a Tee-fitting 140 for the discharge of produced hydrocarbons, a polished rod lubricator 142, and a blow-out-preventer (BOP) 144.

The sucker rod 136 extends downward within the production tubing 148 and is coupled to down-hole pump 150 to transfer reciprocal motion to pump 150. Consequently, reciprocation of the sucker rod draws fluid, e.g. oil, gas, into the tubing 148 and raises the fluid to the surface of the earth.

The surface unit 124 may be called a pump jack or a beam pump. The walking beam 126 includes pumping end 153 and a feature commonly called a "horsehead" 154 attached at the pumping end 153. The horsehead 154 includes a curved surface 156 extending vertically above the well bore 116. The bridle 130 is coupled to the curved surface 156. During operation, as the pumping end 153 and the horsehead 154 reciprocate up and down, the bridle 130 moves with them, resting against various portions of the curved surface 156 to cause pumping string 131 to move vertically with minimal lateral motion. Even so, for various reasons, the pumping string 131 may experience some lateral motion, causing it to rub unevenly against the polished rod lubricator 142, another component of the stuffing box 138, or against the production tubing 148, for example. Lateral motion of pumping string 131 may cause uneven wear and possibly premature failure of a component.

Figure 2:
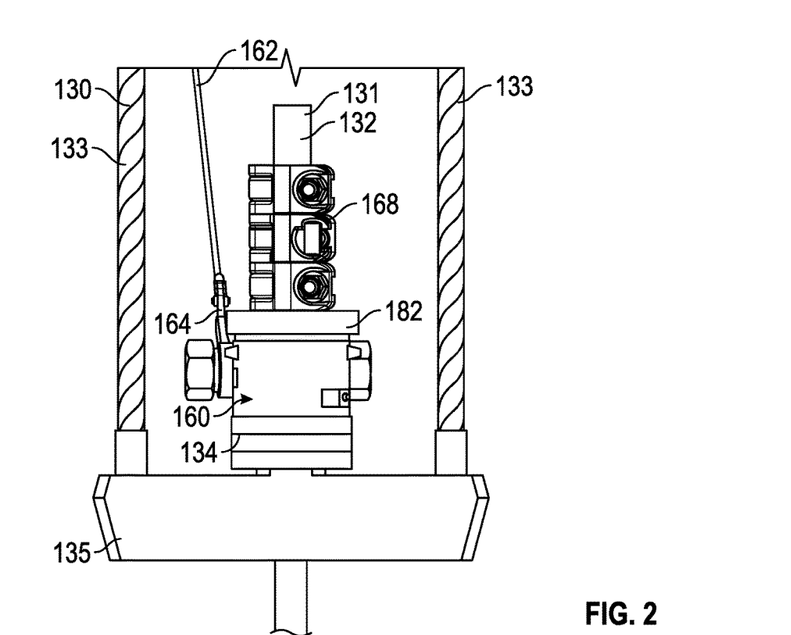
FIG. 2 shows a side view of the rotator mechanism located at the intersection of the polished rod and the lift cable of FIG. 1 in accordance with principles described herein.

Referring to both FIG. 1 and FIG. 2, the pumping system 100 also includes a rotator mechanism 160 located at the intersection of the polished rod 132 and the bridle 130. The closer view of FIG. 2 shows more detail about bridle 130. Bridle 130 includes a plurality of spaced-apart lifting cables 133, a two-piece leveling plate 134, and a carrier bar 135 locate under and supporting the leveling plate. For support, the carrier bar is coupled to the lifting cables 133, which extends up to the horsehead 154. This embodiment includes two spaced-apart lifting cables 133. Rotator mechanism 160 is vertically supported on the leveling plate 134 or carrier bar 135, and is disposed about (i.e. around) the polished rod 132. Polished rod 132 extends above and below mechanism 160 passing through holes in the leveling plate 134 and the carrier bar 135. A clamp or a set of clamps 168 is mounted around polished rod 132 and rests on top of mechanism 160 to transfer the weight of the pumping string 131 and fluid column to mechanism 160 and to bridle 130. Rotator mechanism 160 allows polished rod 132 and the remainder of pumping string 131 to rotate relative to bridle 130 and walking beam 126, for example. The use of the rotator mechanism 160 reduces the potential for uneven wear that could damage the polished rod 132, the polished rod lubricator 142, the sucker rod 136, the production tubing 148, or another component.

Continuing to reference FIG. 2, the mechanism 160 has a longitudinal body axis 161 aligned with rod 132 and generally aligned with wellbore axis 117. Thus, in this example, body axis 161 is vertical. An actuator cable 162 extends from the distal end of an lever 164 of the rotator mechanism 160 to a spring 166 mounted at an anchor point 170 along the beam 126 at an advantageous position between the pivot axis 128 and the horsehead 154. The mechanism 160 travels with the bridle 130 and the polished rod 132 as they reciprocate up-and-down during operation of the pumping system 100, which results in a changing angle between the actuator cable 162 and the body axis 161, an action that develops a periodic, upward force or torque against the lever 164 of the mechanism 160. The upward force causes the lever 164 to rotate upward or clockwise, as viewed in FIG. 1, relative to the remainder of the mechanism 160. The upward, clockwise rotation of arm 164 causes the polished rod 132 and the coupled sucker rod 136 to rotate about the body axis 161. The rotator mechanism 160 will also be called a rod rotator since it is coupled to polished rod 132 to cause the polished rod 132 to rotate. The lever 164 may also be called a lever arm, an actuator arm, or a handle. The actuator cable 162 is an example of an attachment member that couples between a reciprocating member of the surface unit of the pump 100 and the lever 164 to actuate the rotator mechanism 160. Other embodiments may use another type of attachment member such as a rope, a rigid bar, or a tubular member, for example, any of which may be aided by a spring 166 as an option.

Figure 3:
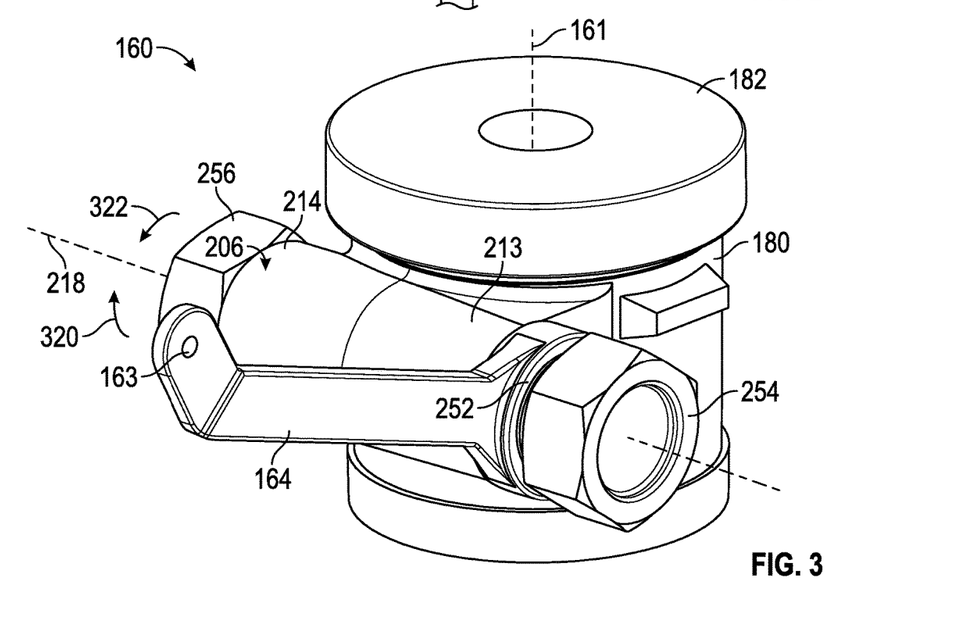
FIG. 3 shows a perspective view of the rotator mechanism of FIG. 2.
Figure 4:
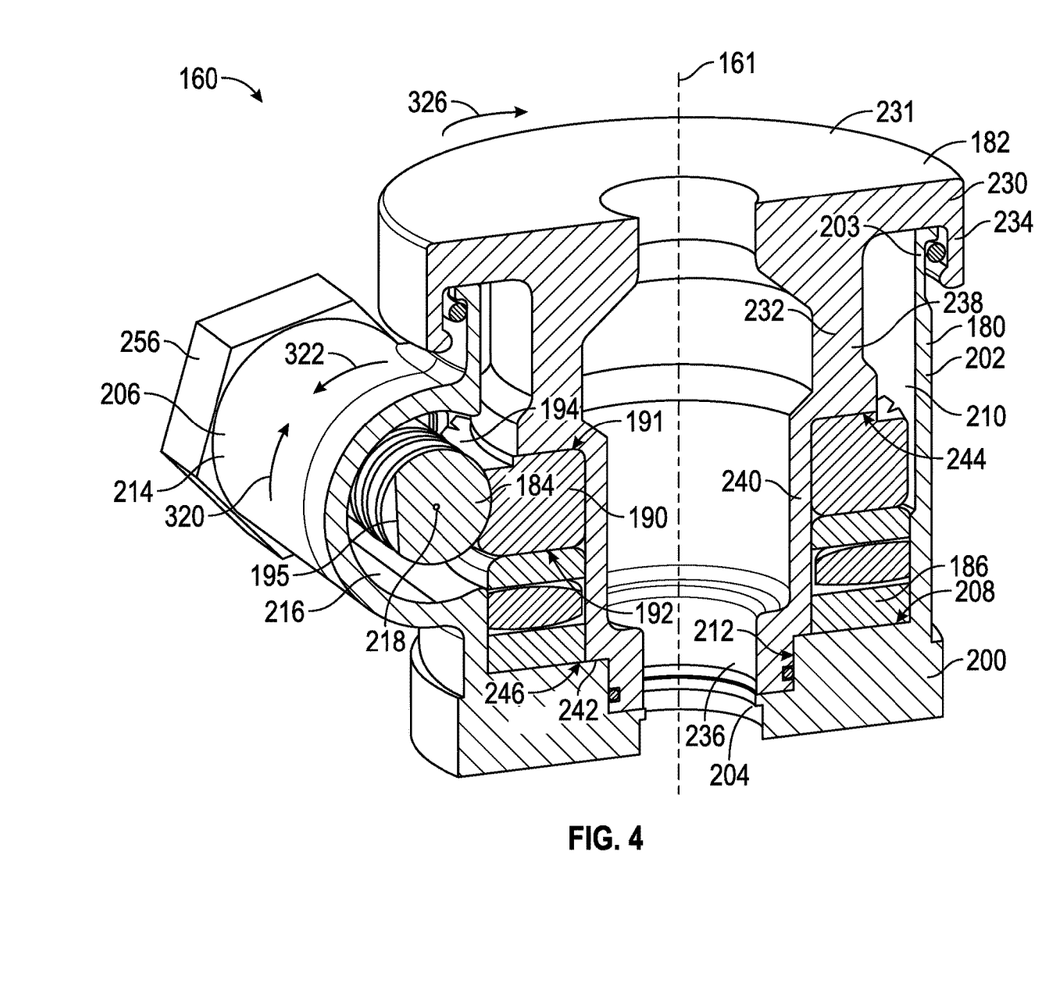
FIG. 4 shows a perspective view in cross-section of the rotator mechanism of FIG. 3 with the cross-section taken near the longitudinal axis.
Figure 5:
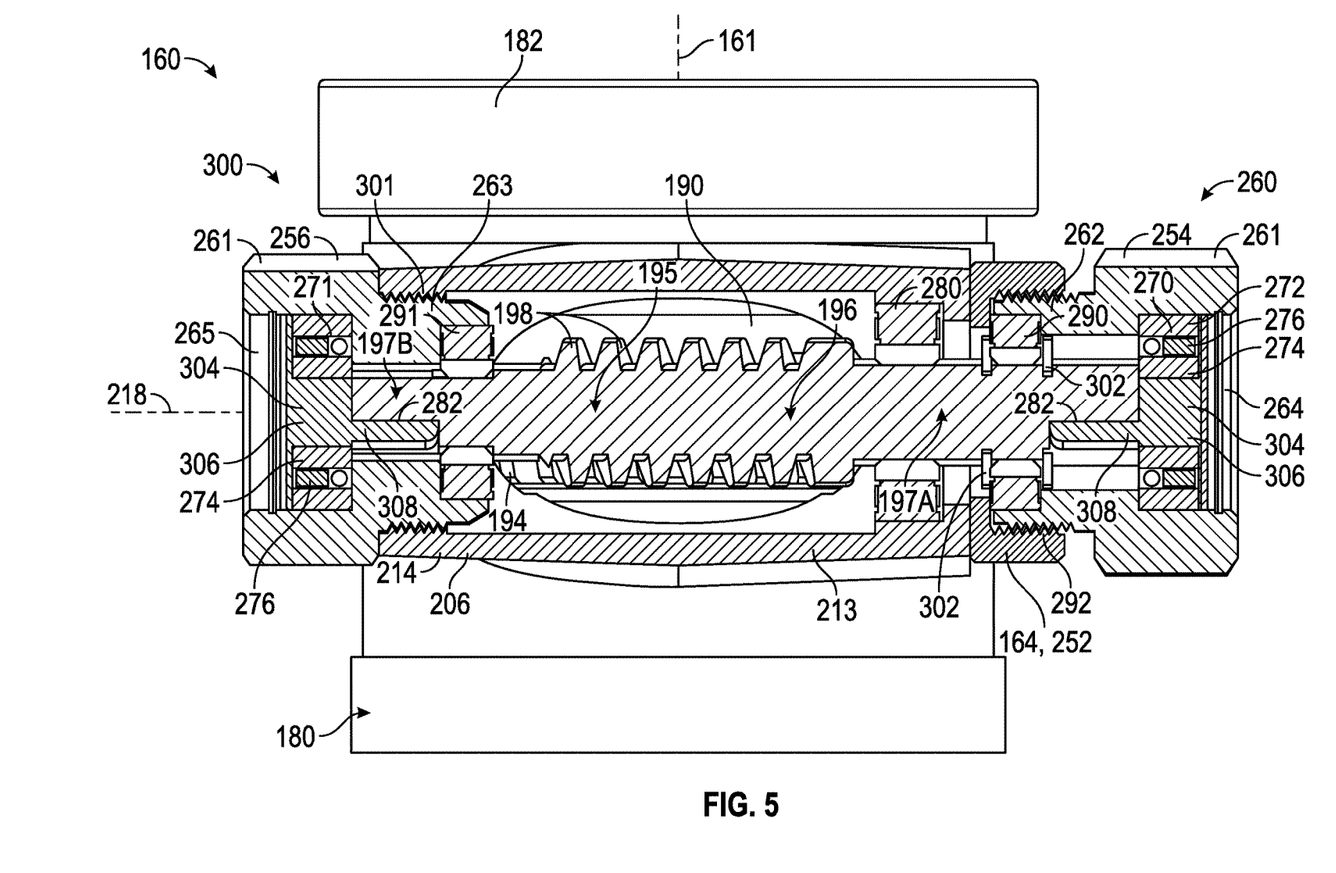
FIG. 5 shows a front view the rotator mechanism of FIG. 3 in partial cross-section, wherein the cross-section is taken near the axis of the worm pinion gear.

Referring now to FIG. 3 and FIG. 4, the rod rotator 160 further includes a body member 180 and a removable cap 182 extending down into the body 180, a worm gear set 184 disposed within the body 180 between the body 180 and the cap 182, and a thrust bearing 186 disposed within the body 180 between the worm gear set 184 and the body 180. Because the cap 182, the worm gear set 184, and the thrust bearing 186 are positioned at least partially inside the body 180, the body 180 may also be called a "housing." The housing or body 180 is rotationally fixed relative to leveling plate 134 and cables 133. The worm gear set 184 includes an annular worm gear 190 meshing with a worm pinion gear or, more simply named, worm 195. Worm gear 190 includes a radially-extending, first or upper surface 191 and a radially-extending second or lower surface 192, and axially-extending teeth 194 along the outer circumference of gear 190. As best seen in FIG. 5, the worm 195 includes a cylindrical worm shaft 196 aligned with worm axis 218, a first or actuation end 197A, a second or backstop end 197B, and two helical threads 198 wound side-by-side around a portion of shaft 177 approximately midway between ends 197A, 197B. In other embodiments, worm 195 may include only one thread 198 or may include a plurality of threads other than two, such as three or four threads, for example. The threads 198 may also be called worm threads. Referring again to FIG. 4, in the assembly of rod rotator 160, the body 180, cap 182, thrust bearing 186, and worm gear 190 are concentrically aligned along body axis 161.

Continuing to reference FIG. 4, the body 180 includes a base plate 200 at its lower end, a tubular wall 202 extending upward from base plate 200 to an upper end 203, and a through-hole 204 in base plate 200 and aligned with the body axis 161. In FIG. 4, base plate 200 and tubular wall 202 form a generally cylindrical portion of body 180, shown in a vertical orientation as an example. Body 180 also includes a generally cylindrical, channel 206 intersecting tubular wall 202 between base plate 200 and upper end 203. The channel 206 is positioned in a horizontal orientation in the example as shown. The top surface of base plate 200 forms an interior, upward-facing shoulder 208 adjacent tubular wall 202. A cylindrical, interior volume 210 is defined by tubular wall 202 and shoulder 208, and a recess 212 is disposed between through-hole 204 and shoulder 208, having another upward-facing shoulder. The channel 206 includes a first or "handle" end 213 (FIG. 3), a second or "backstop" end 214, and a second cylindrical, interior volume 216 between ends 213, 214. Channel 206 defines a worm axis 218 radially displaced from body axis 161 and oriented perpendicular to body axis 161; though axes 161 and 218 do not intersect. The interior volume 216 intersects the interior volume 210. A portion of each volume 210, 216 may be filled with grease.

Referring again to FIG. 3, handle 164 includes an annular end 252 opposite the end having a hole 163 for coupling the actuator cable 162 (FIG. 2). In the assembly of the rod rotator 160, the annular end 252 of handle 164 is disposed between the handle end 213 of the channel 206 and a first clutch housing 254. A second or backstop clutch housing 256 is disposed at the opposite end of channel 206, i.e. at the backstop end 214. As will be described later with reference to FIG. 5, clutch housings 254, 256 each contain a clutch, which in some embodiments is a freewheel-clutch bearing. Clutch housings 254, 256 may also be called bearing housings in at least some embodiments.

Referring to again to FIG. 4, the cap 182 includes an annular, upper end plate 230 having an exterior, upper face 231, a tubular body 232 extending downward from the end plate 230, and a circumferential lip 234 extending downward from the outer edge of the end plate 230. A through-hole or aperture 236 aligned with the body axis 161 extends through the end plate 230 and the tubular body 232. The diameter of the aperture 236 varies along the body axis 161. The tubular body 232 has a smaller outside diameter than does the end plate 230. Tubular body 232 includes an upper portion 238, a middle portion 240, and a lower portion 242, a first, exterior, downward-facing shoulder 244 at the intersection of the upper portion 238 and the middle portion 240, and a second, exterior, downward-facing shoulder 246 at the intersection of the middle portion 240 and the lower portion 242. Cap 182 is coupled for rotation with the worm gear 190 by frictional contact between the downward-facing shoulder 244 and the upper surface 191.

FIG. 5 shows a vertical cross-section through channel 206 with cap 182 and the remainder of body member 180 in the background. The cross-section is taken slightly in front of worm axis 218. In FIG. 5, a handle assembly 260 includes the handle 164, the first clutch housing 254 threadingly coupled to handle 164, first clutch 270 disposed within clutch housing 254, and a first bearing 290 also disposed within clutch housing 254. The first clutch housing 254 includes a first or outer end 261 having a hex-shape exterior surface for engaging an tool, a second or inner end 262 having left-hand threading on its outer surface, and a through-bore 264 extending through ends 261, 262 and having a plurality of portions with different diameters. The first clutch 270 is held by an interference fit within the through-bore 264 at outer end 261. The clutch 270 includes an annular outer race 272 and an annular inner race 274 configured to rotate in a first direction relative to outer race 272 and not to rotate in the opposite direction relative to outer race 272. As shown in the cross-section of FIG. 6, the inner race 274 of the clutch 270 includes a key slot 278.

Referring again to FIG. 5, the annular end 252 of handle 164 includes an inner surface 292 having left-handed threading that engages and grips the threading on inner end 262 of clutch housing 254. The outer race of the first bearing 290 is disposed within the through-bore 264 at inner end 262, being held by an interference fit with through-bore 264 or by clamping action between a shoulder of through-bore 264 and a lip on the annular end 252 of handle 164.

Also in FIG. 5, a backstop assembly 300 includes the second clutch housing 256 along with a second clutch 271 and a second bearing 291 disposed within clutch housing 256. The second clutch housing 256 includes a first or outer end 261 having a hex-shape exterior surface for engaging an tool, a second or inner end 263 having right-hand threading on a portion of its outer surface, and a through-bore 265 extending through ends 261, 263 and having a plurality of portions with different diameters. The second clutch 271 is held by an interference fit within the through-bore 265 at outer end 261. The clutch 271 is the same type as clutch 270, having the same components 272, 274, 278. However, bearings 270 and 271 are positioned or oriented in opposite directions within the assembly of rod rotator 160, as will be explained later. The outer race of the second bearing 291 is disposed within the through-bore 265 at inner end 263 and is held by a sliding fit or interference fit with through-bore 265.

Figure 6:
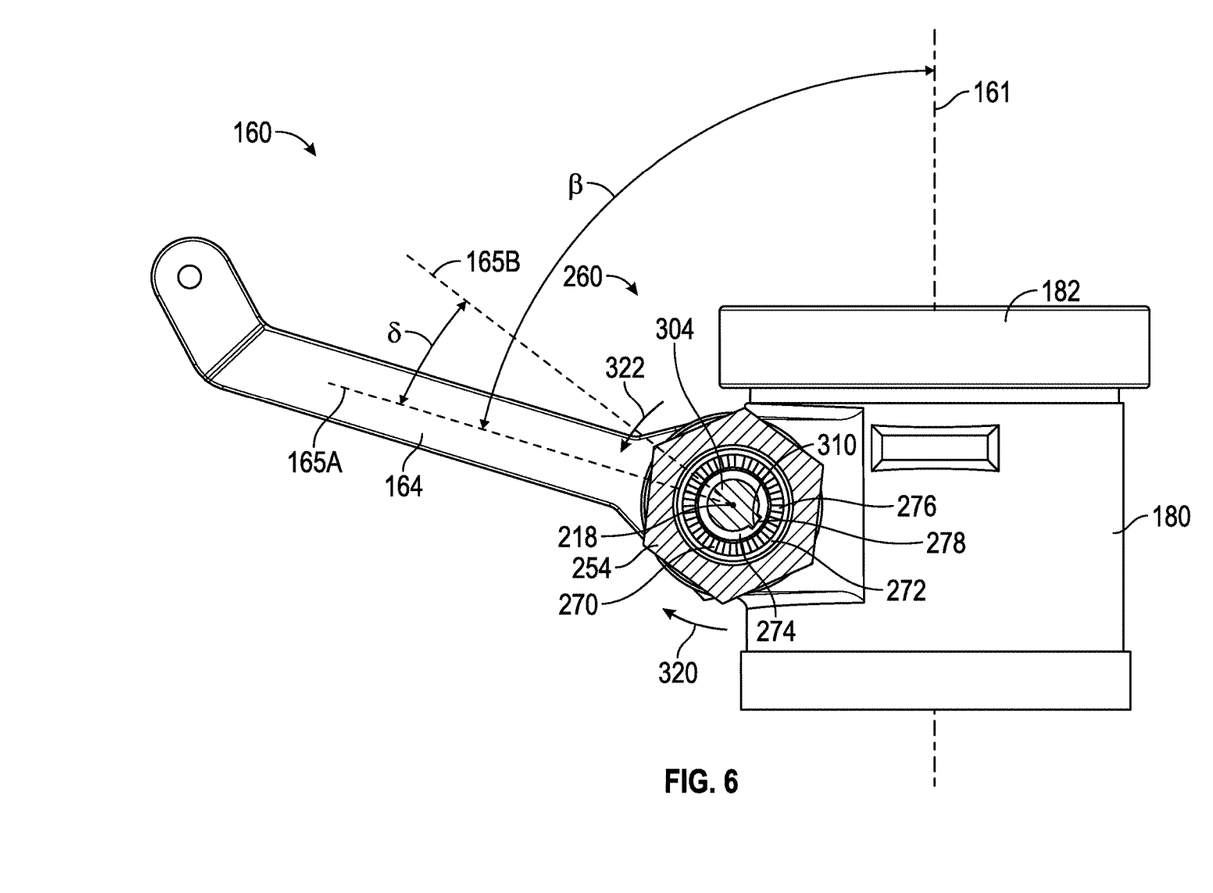
FIG. 6 shows a side view of rotator mechanism of FIG. 3 in partial cross-section, wherein the cross-section is taken through of the handle assembly, perpendicular to the axis of the worm pinion gear.

As shown in FIG. 5 and FIG. 6, clutches 270, 271 are freewheel clutch bearings having a central axis and a plurality of circumferentially-spaced movable members called sprags 276 axially-adjacent a plurality of circumferentially-spaced bearing elements integrated into a single package. The sprags and the bearing elements are disposed and coupled between a single pair of inner and outer races, i.e. the races 272, 274. The bearing elements may be roller bearings or ball bearings, for example. A portion of races 272, 274 may be tapered relative to the central axis in order to hold axial thrust. In the view of FIG. 6, sprags 276 are rectangular members movably disposed at a slight, changeable angle with respect to the radial direction and are configured to allow rotation of the outer race 272 relative to the inner race 274 in a freewheel direction about axis 218 while inhibiting the relative rotation in the opposite direction. These rotational directions are described below.

In some embodiments, clutches 270, 271 are GMN freewheel clutch bearings, model FKN6204-2RS of GmbH & Company. In some other embodiments, clutches 271, 270 are selected to be a freewheel-clutch not having bearings integrated within a single pair of races. Such embodiments may also include another, separate bearing (i.e. a bearing assembly) in each clutch housing 254, 256, adjacent the clutch. Thus, the clutches 270, 271 may be selected to be another of the sprag-type clutches, series 400 from GMN or any suitable, commercially available freewheel-clutch, freewheel-clutch bearing, or another suitable clutch providing smooth angular movements without ratchet-style teeth that are limited to discrete angular steps. Although shown as identical, in some embodiments, clutch 271 may be selected to have a different design or operational configuration than clutch 270.

Referring still to FIG. 5, a third bearing 280 is disposed on the actuation end 197A of the threaded worm 195, proximal worm threads 198. The outer race of the third bearing 280 is held within an inner surface of channel 206 of body 180 proximal the actuation end 213. The end 197A of worm 195 extends beyond the end 213 and includes a rectangular slot 282 at the terminal portion of end 197A. The opposite end of worm 195, the backstop end 197B, extends slightly beyond the backstop end 214 of channel 206 and includes a rectangular slot 282 at the terminal portion of end 197B.

In the assembly of rod rotator 160, the bearing 291 within the backstop assembly 300 is received on the backstop end 197B of worm 195, forming a sliding fit between bearing 291 and worm 195. One side of inner race 274 of clutch 271 is disposed adjacent the end face of backstop end 197B. The right-hand threading at inner end 263 of clutch housing 254 engages right-hand threading 301 on the inner surface of backstop end 214 on channel 206, and the outer end 261 of clutch housing 254 butts against channel end 214, forming a firm coupling and fixing the angular and axial positions of the assembly 300. A shaft plug 304 fixedly couples worm 195 to the inner race 274 of the clutch 271 for rotation together. The shaft plug 304 includes a generally cylindrical end 306, a rectangular boss 308 extending axially from end 306, and a key boss or, simply, a key 310 (not shown in FIG. 5) projecting radially out from cylindrical end 306. For reference, FIG. 6 shows a key 310 on another shaft plug 304 installed within handle assembly 260, which is similar to the installation of the plug 304 and key 310 in backstop assembly 300. Returning to FIG. 5, when the shaft plug 304 is installed, rectangular boss 308 is positioned within rectangular slot 282 at the end 197B of worm 195, and cylindrical end 306 is positioned within the inner race 274 of the clutch 271 with the key slot 278 slidingly receiving the key 310. A cover plate and a snap ring fit within the outer end of through-bore 265 to retain shaft plug 304 and to protect clutch 271 from debris. The rotation of worm 195 relative to clutch housing 256 of assembly 300 and body 180 is governed, at least in part, by the characteristics and orientation of the clutch 271, which will be explained in more detail below.

Also in the assembly of rod rotator 160, bearing 290 of the handle assembly 260 is slidingly received on the actuation end 197A of the threaded worm 195, and one side of inner race 274 of clutch 270 butts against the end face of actuation end 197A. The axial position of assembly 260 is further set by two external snap rings 302, one on either side of bearing 290, positioned within grooves on worm 195. The left side of the annular end 252 of the handle 164 is adjacent and end face of actuation end 213 of the channel 206 and may slidingly contacting end 213. Assembly 260 is further coupled to worm 195 by another shaft plug 304, which is positioned within rectangular slot 282 at the end 197A and within the clutch inner race 274. As shown in FIG. 6, the key 310 of shaft plug 304 is received within key slot 278 of inner race 274. A cover plate and a snap ring fit within the outer end of through-bore 265 to retain shaft plug 304 and to protect clutch 271 from debris. The shaft plug 304 fixedly couples the worm 195 to the inner race 274 of the clutch 270 for rotation together. The rotation of worm 195 relative to handle 164 and clutch housing 254 is governed, at least in part, by the characteristics and orientation of the clutch 270, which will be explained subsequently.

Examples of the Operation of Rotator Mechanism 160

Referring again to FIG. 1 and FIG. 3, during operation of pumping system 100, the horsehead 154 of walking beam 126 reciprocates the lifting bridle 130, the rod rotator 160, and the pumping string 131, which includes polished rod 132. During a down-stroke of the horsehead 154, the reducing angle $\alpha$ ("alpha") between the actuator cable 162 and the body axis 161 of the rod rotator 160 develops an upward force against the lever 164 causing the lever 164 to rotate in a first direction 320 about worm axis 218, upward relative to the body 180 of the rod rotator 160. The direction 320 is clockwise, as viewed from the outer end of first clutch housing 254 in FIG. 1 and FIG. 3. Similarly, a changeable angle $\beta$ ("beta") can be measured between lever 164 and body axis 161 or between lever 164 and a vertical line passing through worm axis 218. Generally, based on the tension in cable 162, angle $\beta$ reduces or increases as angle $\alpha$ reduces or increases, respectively. Angle $\beta$ may also be called the "lever angle."

Referring now to FIG. 6, lever arm 164 has a resting position 165 indicated by a dashed line. The resting position 165A relative to body 180 may be based on components within rod rotator 160 or may be based on the length and arrangement of cable 162 along walking beam 126, as examples. An upward, clockwise (CW) rotation of lever arm 164 in the direction 320, away from resting position 165A and to a different angular position 165B, causes first clutch housing 254 and the outer race 272 of the first clutch 270 to rotate. Due to the characteristics and orientation of the clutch 270, sprags 276 lock against inner race 274 when outer race 272 rotates in the direction 320. As a result, the entire clutch 270 and shaft plug 304 to rotate about worm axis 195 in the first direction 320. Thus, the handle assembly 260 (which includes the clutch 270) locks and rotates in the first direction when handle 164 rotates in the first direction. When rotating from resting position 165A to position 165B, lever arm 164 moves through an angle $\delta$ ("delta") measured about worm axis 218.

Referring to FIG. 1 and FIG. 6, during an upstroke of the horsehead 154, the increasing angle $\alpha$ releases the upward force of cable 162 against the lever 164. The weight of the cable 162 and the lever 164 cause the lever 164 to rotate in a second direction 322 about worm axis 218, downward relative to the body 180. The second direction 322 is counterclockwise (CCW) as viewed from the outer end of first clutch housing 254. The downward, CCW rotation of arm 164 in the direction 322 causes outer race 272 of the first clutch 270 to rotate in the same direction. In this condition, sprags 276 relax and freely side against inner race 274. Thus, outer race 272 is said to "freewheel," i.e. to rotate freely, in the second direction 322 relative to inner race 274 so that shaft plug 304 is not forced to rotate when lever 164 moves in the second direction 322.

Referring first to cross-sectional view of FIG. 5, the effect of the rotation of lever 164 on the worm gear set 184 and cap 182 will be described. When the lever 162 moves upward, rotating in the first direction 320 (CW as viewed in FIG. 6), handle assembly 260 locks by the action of first clutch 270. The torque of lever 164 is transferred through shaft plug 304 to worm 195, causing worm 195 to rotate about worm axis 218 in the first direction 320 and causing the shaft plug 304 at backstop end 197B and the inner race 274 of second clutch 271 also to rotate in the first direction 320. The orientation of second clutch 271 within backstop assembly 300 is such that inner race 274 can spin or rotate freely in the first direction 320 relative to outer race 272 and backstop clutch housing 256, which are fixedly coupled to body 180 and cannot rotate with worm 195. Thus, for clutch 271 mounted as shown, the first direction 320 corresponds to (i.e. is the same as) the freewheel direction for inner race 274 to rotate relative to outer race 272.

With reference to FIG. 4, continuing to consider the rotation of worm 195 about worm axis 218 in the first direction 320, the engaged threads of worm set 184 drives the worm gear 190 to rotate in a selected or predetermined direction 326 about body axis 161. In FIG. 4, the predetermined direction 326 is shown to be clockwise when viewing upper face 231 of cap 182. In some embodiments, having a different set of threads in the worm gear set 184, the predetermined direction 326 is counterclockwise. Referring to FIG. 2 in addition to FIG. 4, the weight of pumping string 131 is held against cap 182 by clamps 168, and consequently, cap 182 is held against the worm gear 192. As a result, the cap 182 and the pumping string 131, including polished rod 132, rotate in the predetermined direction 326 about the body axis 161 when the worm gear 190 rotates in that direction, which may results from lever 164 rotating in the first direction 320, as previously discussed.

When the lever 164 is not moving or moves in the second direction 322, first clutch 270 freewheels and shaft plug 304 and the fixedly coupled worm 195 is not forced to rotate about worm axis 218. However, in some instances, a vibration, a tension, or some other phenomenon exerted on or within the rod rotator 160 may develop a torque on worm 195, inducing it to attempt to rotate in the second direction 322, which may cause pumping string 131 to rotate backwards with respect to the predetermined direction 326 (FIG. 4). A torque on worm 195 acting the second direction 322 would attempt to rotate the inner race 274 relative to the outer race 272 of the second clutch 271. However, due to the characteristics and orientation of the clutch 271, the included sprags 276 lock the clutch 271 and therefore the entire backstop assembly 300 against rotation in the second direction 322 about worm axis 218. This locking action of backstop assembly 300 inhibits the rotation of worm 195 in the second direction 322, which in-turn inhibits the rotation of worm gear 190, cap 182, and pumping string 131 about body axis 161 in the direction opposite the predetermined direction 326.

Referring again to FIG. 6, clutch 270 of handle assembly 260 is configured so that even a small reduction in lever angle β, which is equivalent to a small movement of lever arm 164 through the angle δ, will cause sprags 276 to lock against inner race 274, causing the handle assembly 260 to lock and rotate in the first direction 320. As a result, the inner race 274 and the worm 195 rotate in the first direction 320 about the worm axis 218. Aided by the action of second clutch 271, inner race 274 and the worm 195 remain in a different angular position when lever arm 165 returns to its resting position 165A. Due to the direct coupling of lever arm 164 in this embodiment, inner race 274 and the worm 195 also rotate through the angle δ.

For comparison, some conventional systems use a ratchet mechanism having a rotating pawl that engages the internal teeth of an annular ring to drive the steady rotation of a polished rod in a selected direction. The conventional system may also have other differences from rod rotator 160. In an example, for a conventional annular ring having 24 teeth, the pawl and axle must rotate through a minimum angle of 15 degrees (i.e. 360°/24) in order to progress to the next tooth to hold the pawl in a new angular position and to rotate and hold the polished rod in a new angular position. In contrast, for at least some embodiments of the current disclosure, the angle δ is less than the minimum movement angle for lever arms of various conventional systems. In some embodiments, The clutch 270 locks or engages after the lever 164 and the outer race 274 rotates in the first direction 320 through an angle δ having a value between zero and 15 degrees. In such a case, the angle β is reduced by less than 15 degrees during this stage of reciprocation. In some embodiments, clutch 270 is configured to engage when lever 164 rotates through an angle δ having a value is between zero and 7.5 degrees. In some embodiments, clutch 270 is configured to engage when lever 164 rotates through an angle δ having a value is between zero and 2 degrees. Rotations of lever 164 by an angle δ of 15 degrees or greater (i.e. angle β reduces by 15 degrees or more) will also result in the engagement clutch 270 and a corresponding rotation of the worm 195.

Referring again to FIG. 5, the clutch 271 of in backstop assembly 300 is similar to or identical to clutch 270, having the same characteristics and being concentrically mounted along worm axis 218; although, clutch 271 is mounted with the opposite orientation. Clutch 271 and backstop assembly 300 are configured to inhibit even a small rotation of worm 195 in the reverse direction 322 and to inhibit the reverse rotation of a pumping string 131, i.e. rotation opposite the preferred direction 326. Clutch 271 is configured to lock or engage after its inner race 274 rotates by less than 15 degrees with respect to the fixed, non-rotating outer race 272. In some embodiments, clutch 271 is configured to engage after its inner race 274 rotates by less than 7.5 degrees. In some embodiments, clutch 271 is configured to engage after its inner race 274 rotates by less than 2 degrees.

In the rod rotator 160, the clutches 270, 271 govern, at least in part, the rotational motion of worm gear set 184 and cap 182 as lever 164 cycles up and down or CW and CCW (depending on the view orientation), assisting or allowing forward rotation of cap 182 in the preferred direction 326 about body axis 161 and inhibiting or reducing the potential for reverse rotation, opposite the direction 326. When installed in pumping system 100, the clutches 270, 271 in the rod rotator 160 govern, at least in part, the rotational motion of pumping string 131 relative to wellbore 116 about wellbore axis 117, assisting, or allowing forward rotation in the preferred direction 326 and inhibiting or reducing the potential for reverse rotation, opposite the direction 326.

Referring again to FIG. 2 and FIG. 4, in some instances, the cap 182 or the pumping string 131 may remain stationary with when worm gear 190 rotates about body axis 161. In some instances, the cap 182 or the pumping string 131 may be rotated by an outside force when worm gear 190 does not rotate. This torque-limiting feature of rod rotator 160 is made possible by the frictional coupling of cap 182 and worm gear 190 at the intersection of the shoulder 244 and the surface 191, allowing shoulder 244 to slip relative to the surface 191. The torque-limiting feature of rod rotator 160 is also made possible by the frictional coupling of pumping string 131 on the upper face 231 of cap 182, allowing the pumping string 131 and the clamps 168 to slip relative to the upper face 231.

A Second Exemplary Embodiment of a Rotator Mechanism

Figure 7:
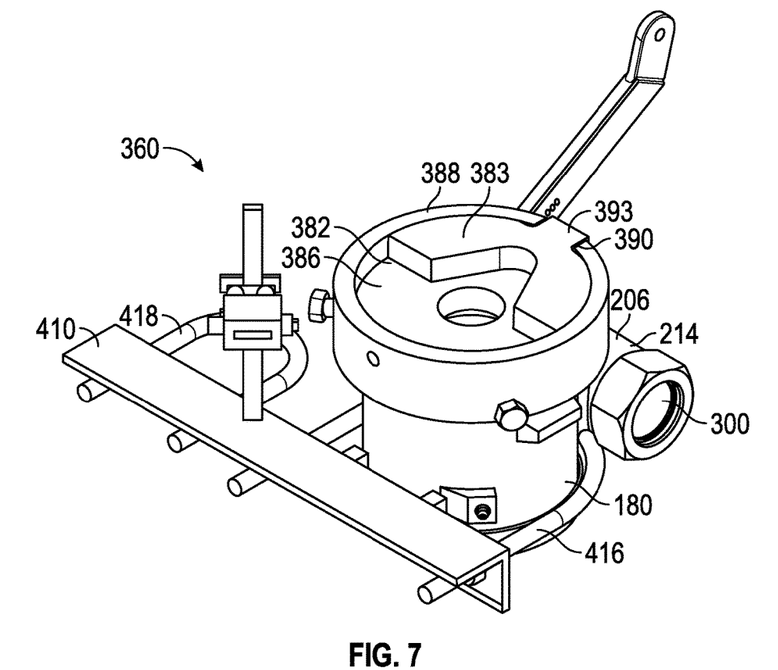
FIG. 7 shows a perspective view of a second embodiment of a rotator mechanism having a non-slip configuration and being compatible with the pumping system of FIG. 1, in accordance with principles described herein.
Figure 8:
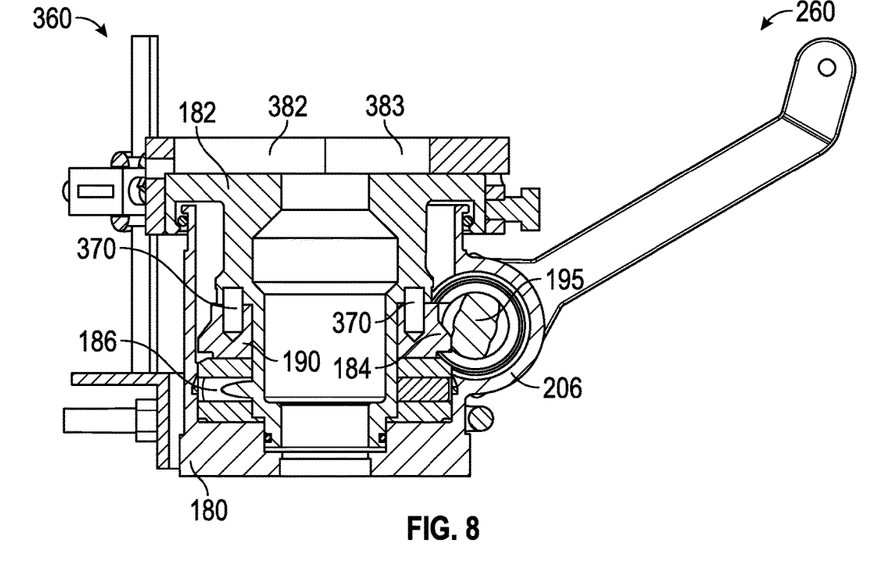
FIG. 8 shows a side view in cross-section of the rotator mechanism of FIG. 7.

FIG. 7 and FIG. 8 show a second rotator mechanism configured to operate in a pumping system such as pumping system 100. This non-slip rotator mechanism 360, which may also be called a non-slip rod rotator, includes many of the same features and components of rod rotator 160, such as a body member 180 having a channel 206, a worm gear set 184 disposed in body 180, removable cap 182 extending down into the body 180, a thrust bearing 186 supporting worm gear set 184, a handle assembly 260 disposed at a first or "handle" end of channel 206, and a backstop assembly 300 disposed at a second or "backstop" end 214 of channel 206. The worm gear set 184 includes an annular worm gear 190 meshing with a worm pinion gear or, equivalently, a worm 195. The handle assembly 260 includes a first clutch 270 disposed within a first clutch housing 254 (See FIG. 5 for a view of the same the arrangement). Similarly, the backstop assembly 300 includes a second clutch 271 disposed within a second clutch housing 254 (Again, FIG. 5 provides a view of the same the arrangement).

Rod rotator 360 further includes an upper cap 382 coupled to the upper end of the cap 182 and includes a rod coupler 383 disposed within the upper cap 382. The upper end 384 of cap 382 includes a recess 386 having an axially-extending, circumferential lip 388 with a slot 390. Rod coupler 383 is disposed within recess 386 of cap 382 and includes a key or tab 393 received within slot 390. The upper cap 382 and the rod coupler 383 prevents pumping string 131, e.g. polished rod 132 and clamps 168 (FIG. 2 has an example), from rotating relative to the cap 182, facilitating one aspect of the non-slip feature of rod rotator 360.

Whereas the worm gear 190 and the cap 182 of rod rotator 160 (best shown in FIG. 4) are coupled for rotation by friction, and this frictional coupling allowed for slippage in some circumstances, in rod rotator 360 the worm gear 190 and the cap 382 are rigidly coupled for rotation together. In FIG. 8, a plurality of pins 370 extend within holes in the mating surfaces of worm gear 190 and the cap 382 to facilitate the rigidly coupling of worm gear 190 and the cap 182.

Thus, some embodiments of non-slip rod rotator 360 do not have the torque-limiting feature of rod rotator 160. In other embodiments of rod rotator 360, pins 370 are shear pins configured to shear or break when exposed to a rotational torque or a resulting shear force greater than a prescribed value, allowing worm gear 190 to rotate relative to the cap 182 in such circumstances. Therefore, some embodiments of rod rotator 360 having shear pins include both the non-slip feature for normal operation and the torque-limiting feature for a higher-than-allowable rotational torque, as may be applied between rod rotator 360 and pumping string 131, for example.

The assemblies 260, 360, including the clutches 270, 271 respectively, of rod rotator 360 perform as do the assemblies 260, 360 and clutches 270, 271 of rod rotator 160.

Also shown in FIG. 7, a reaction clamp 410 has a first gripping member 416 mounted around the body 180 of rod rotator 360 and has a second gripping member 418 for coupling to a cable 133 of bridle 130. The reaction clamp 410 prevents body 180 from rotating with respect to walking beam 126 and wellbore 116 when installed and operated on the pumping system 100. A reaction clamp 410 may also be used with rod rotator 360.

Additional Information

In addition to being configured to operate at an oil well, a pumping unit like pumping system 100, having a rod rotator 160 may be used for water wells or for systems that handle fluids initially disposed in an above-ground tank or above-ground natural reservoir or may be used for systems that raise a fluid or a mixture of fluids other than oil or water.

Examples of various embodiments have been presented. Additional embodiments may share characteristics of one or more of the previously-described embodiments. Some possible variations or additional embodiments are described next.

Although shown in FIG. 1 as a pump jack or a beam pump, in various embodiments, the surface unit 124 may implemented as a hydraulic lift or another method of reciprocation.

Referring to FIG. 5, although shown as integral members of worm 195, in some embodiments, worm threads 198 may be formed as a separate component and slidingly received on worm shaft 196 to form worm 195.

Referring to FIG. 5, the first clutch 270 that governs the actuation of rod rotator 160 and the second clutch 271 that prevents reverse rotation of pumping string 131 are concentrically aligned with and are rotationally coupled to the same worm 195 of a single worm gear set 184. It is also possible to produce a rod rotator having the clutch 271 not concentrically aligned with clutch 270. It is possible to produce a rod rotator having more than one worm gear set 184. Such rod rotator configurations would fall within the scope of this disclosure.

While exemplary embodiments have been shown and described, modifications thereof can be made by one of ordinary skill in the art without departing from the scope or teachings herein. The embodiments described herein are exemplary only and are not limiting. Many variations, combinations, and modifications of the systems, and apparatuses described herein are possible and are within the scope of the disclosure. Accordingly, the scope of protection is not limited to the embodiments described herein, but is only limited by the claims that follow, the scope of which shall include all equivalents of the subject matter of the claims.

What is claimed is:

1. A rotator mechanism for rotating an elongate member that extends into a well bore and that is coupled to a reciprocating member of a pumping system, the rotator mechanism comprising:

a rotator body having a body axis and a through-hole for receiving a portion of the elongate member;

a first freewheel clutch configured to cause the elongate member to rotate incrementally about the body axis in a predetermined direction when the reciprocating member reciprocates; and a second freewheel clutch spaced from the first freewheel clutch and configured to prevent the elongate member from rotating opposite the predetermined direction when the reciprocating member reciprocates.

2. The rotator mechanism of claim 1 wherein at least one of the first freewheel clutch and the second freewheel clutch comprises a plurality of circumferentially-spaced sprags.

3. The rotator mechanism of claim 1 wherein at least one of the first freewheel clutch and the second freewheel clutch comprises a plurality of circumferentially-spaced bearing members.

4. The rotator mechanism of claim 3 wherein the plurality of circumferentially-spaced bearing members comprise roller bearings.

5. The rotator mechanism of claim 1 further comprising:
a worm gear disposed about the body axis;
a worm meshing with the worm gear and extending along a worm axis that extends perpendicularly to the body axis, the worm configured to rotate about the worm axis;
a lever coupled to the worm and configured to rotate the worm relative to the body;
wherein the first freewheel clutch is coupled between the lever and the worm and configured to cause the worm to rotate in a first direction about the worm axis when the lever rotates in the first direction, and configured to allow the lever to rotate freely relative to the worm when the lever rotates in a second direction, opposite the first direction; and
wherein the second freewheel clutch is coupled to the worm and configured to allow the worm to rotate in the first direction and to prevent the worm from rotating in the second direction; and
wherein the first and second freewheel clutches each include a first race disposed about the worm axis, a second race disposed about the worm axis, and a plurality of circumferentially-spaced clutch elements disposed between the first and second races.

6. The rotator mechanism of claim 5 wherein the circumferentially-spaced clutch elements comprise roller bearings.

7. The rotator mechanism of claim 5 wherein the circumferentially-spaced clutch elements are configured to require the second race to rotate in the first direction along with the first race when the first race is rotated in the first direction; and
wherein the circumferentially-spaced clutch elements are configured to allow the second race to rotate relative to the first race when first race rotate is rotated in the second direction.

8. A rotator mechanism for rotating an elongate member that is configured for reciprocation in a pumping system, the rotator mechanism comprising:
a worm gear configured to rotate the elongate member in incremental steps;
a worm meshing with the worm gear and disposed for rotation about a worm axis; and
a first clutch comprising a first race and a second race, the second race coupled to the worm so as to rotate along with the worm;
wherein the first clutch is configured such that a plurality of repeated cycles that include incremental rotation of the first race in a first direction about the worm axis followed by rotation of the first race in a second direction about the worm axis causes the second race and the worm to make a plurality of incremental rotational movements that progress in the first direction; and
wherein, within each of the repeated cycles, the first race moves in the first direction by an angle that is greater than zero and less than 15 degrees.

9. The rotator mechanism of claim 8 wherein within each of the repeated cycles, the angle is greater than zero and less than 7.5 degrees.

10. The rotator mechanism of claim 8 further comprising:
a body including through-hole configured to receive a portion of the elongate member;
a second clutch comprising:
a first race coupled to the body in a manner the prevents rotation of the first race relative to the body; and
a second race coupled to the worm;
wherein the second clutch is configured to allow the worm to rotate in the first direction about the worm axis and to prevent the worm from rotating in the second direction about the worm axis.

11. The rotator mechanism of claim 8 further comprising:
a body including a through-hole configured to receive a portion of the elongate member; and
a lever coupled to the first race of the first clutch to rotate along with the first race; and
wherein the worm gear includes a central hole concentrically aligned with the through-hole of the body and configured to receive a portion of the elongate member.

12. The rotator mechanism of claim 8 further comprising a plurality of circumferentially-spaced clutch elements disposed between the first and second races.

13. The rotator mechanism of claim 12 wherein the circumferentially-spaced clutch elements comprise roller bearings.

14. A rotator mechanism for rotating an elongate member that is configured for reciprocation in a pumping system, the rotator mechanism comprising:
a body including a longitudinal body axis and a through-hole aligned with the body axis and configured to receive a portion of the elongate member;
a worm gear set coupled to the body and including:
a worm gear disposed for rotation about the body axis; and
a worm meshing with the worm gear and disposed for rotation about a worm axis;
a lever coupled to the worm and configured to rotate the worm relative to the body; and
a first clutch including:
a first race coupled to the lever in a manner the prevents rotation of the first race relative to the lever; and
a second race coupled to the worm in a manner the prevents rotation of the second race relative to the worm;
wherein the first clutch is configured to cause the worm and the second race to rotate in a first direction about the worm axis when the lever and the first race move in the first direction, and configured to allow the lever and the first race to rotate relative to the worm when the lever moves in a second direction about the worm axis, opposite the first direction; and
wherein the worm gear is configured to rotate the elongate member about the body axis when the worm rotates in the first direction.

15. The rotator mechanism of claim 14 wherein the first clutch comprises circumferentially-spaced clutch elements between the first and second races.

16. The rotator mechanism of claim 15 wherein the circumferentially-spaced clutch elements comprise roller elements.

17. The rotator mechanism of claim 15 wherein the circumferentially-spaced clutch elements comprise sprags.

18. The rotator mechanism of claim 15 wherein the first race is an outer race, and the second race is an inner race, and wherein the plurality of circumferentially-spaced clutch elements comprise:
- a plurality of roller elements disposed axially-adjacent a plurality of circumferentially-spaced sprags.

19. The rotator mechanism of claim 14 further comprising a second clutch comprising:
- a first race coupled to the body in a manner the prevents rotation of the first race relative to the body; and
- a second race coupled to the worm;
- wherein the second clutch is configured to allow the worm to rotate in the first direction about the worm axis and to prevent the worm from rotating in the second direction about the worm axis.

20. The rotator mechanism of claim 14 wherein the worm gear is configured such that repeated cycles that include rotation of the first race in the first direction by an angle delta followed by rotation of the first race in the second direction opposite the first direction causes the second race and the worm to rotate incrementally, progressing in the first direction; and
- wherein, within each of the repeated cycles, the angle delta is greater than zero and less than 15 degrees.

21. The rotator mechanism of claim 20 wherein within each of the repeated cycles, the angle delta is greater than zero and less than 7.5 degrees.

* * * * *